United States Patent [19]

Kaneko et al.

[11] Patent Number: 5,030,969

[45] Date of Patent: Jul. 9, 1991

[54] RIBBON CHARGING MECHANISM IN A MULTICOLOR THERMAL TRANSFER PRINTER

[75] Inventors: Yukihiro Kaneko; Masatoshi Noguichi; Kouji Shimizu, all of Tokyo, Japan

[73] Assignee: Graphtec Kabushiki Kaisha, Tokyo, Japan

[21] Appl. No.: 557,970

[22] Filed: Jul. 26, 1990

[30] Foreign Application Priority Data

Jul. 26, 1989 [JP] Japan .................................. 1-191315

[51] Int. Cl.[5] ........................ G01D 15/10; B41J 2/325; B41J 35/22

[52] U.S. Cl. ............................... 346/76 PH; 400/120; 400/206.2

[58] Field of Search .................... 346/76 PH; 400/120, 400/120 MC, 206.2, 206.3

[56] References Cited

U.S. PATENT DOCUMENTS 4,809,018 2/1989 Nakamura et al. ............ 346/76 PH 4,898,484 2/1990 Aoyagi et al. ....................... 400/120

FOREIGN PATENT DOCUMENTS 0184234 6/1986 European Pat. Off. ......... 400/206.2

*Primary Examiner*—Benjamin R. Fuller

*Assistant Examiner*—Huan Tran

*Attorney, Agent, or Firm*—Spensley Horn Jubas & Lubitz

[57] ABSTRACT

Several pairs of ink sheet reels are mounted on an ink sheet stock assembly. The supporting axis of a sheet take-up reel of a pair of ink sheet reels is grasped by an axis clutch of a sheet transfer assembly, and the sheet transfer assembly is placed at the remote end from the ink sheet stock assembly, outstretching the ink sheet between the stock reel and the take-up reel pair. When a new ink sheet is to be used, the sheet transfer assembly comes to a position nearest to the ink sheet stock assembly. This position is the transfer position where an empty axis clutch for sheet take-up reel of the ink sheet stock assembly takes the sheet take-up reel from the axis clutch of the sheet transfer assembly. A new pair of ink sheet reels comes down to this position, hokding a new sheet take-up reel. The axis clutch of the sheet transfer assembly takes the new sheet take-up reel and recedes in a horizontal direction outstreching a new ink sheet.

1 Claim, 7 Drawing Sheets

1: INK SHEET STOCK ASSEMBLY
2: THERMAL HEAD ASSEMBLY
3: PLATEN
4: RECORDING PAPER
5: SHEET TRANSFER ASSEMBLY
21: MOTOR
51: MOTOR
55: MOTOR

FIG. 5
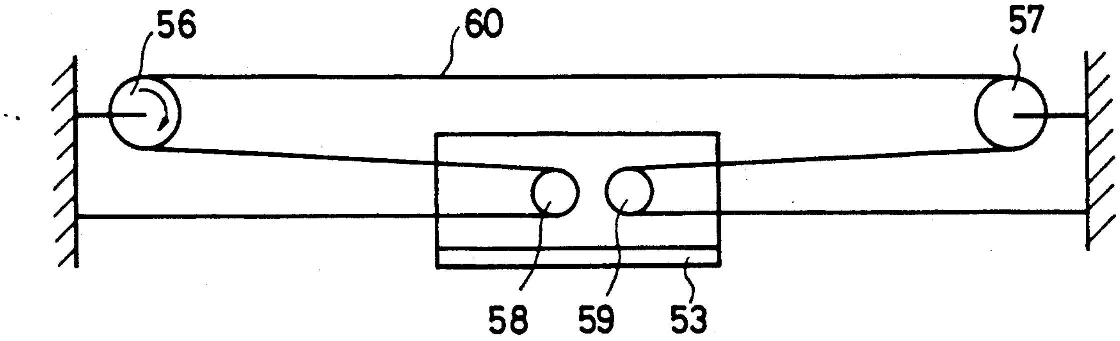
56,57,58,59: PULLEYS 60: BELT
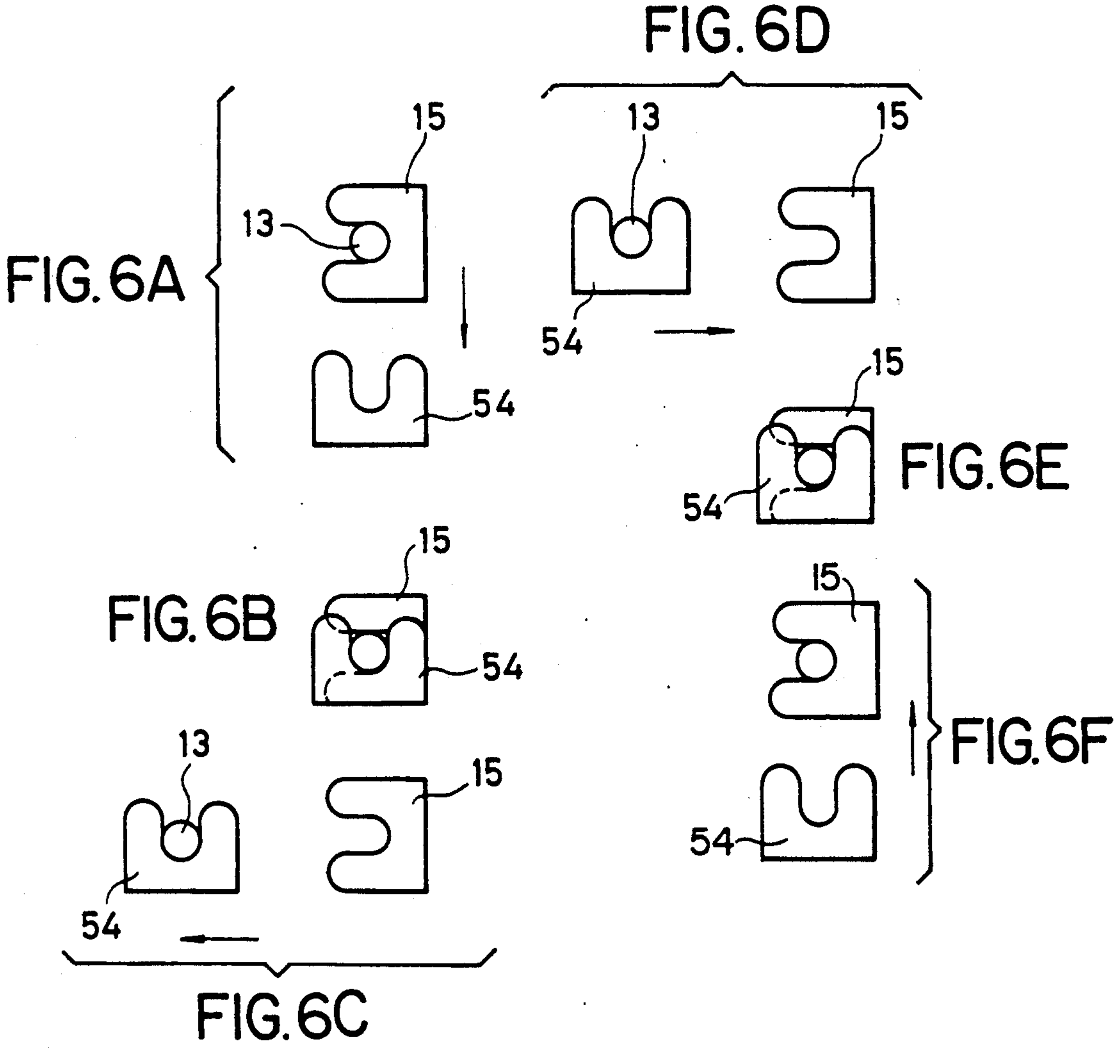

RIBBON CHARGING MECHANISM IN A MULTICOLOR THERMAL TRANSFER PRINTER

BACKGROUND OF THE INVENTION

This invention relates to a thermal transcription recorder, and more particularly to such a recorder in which multi-coloured drawings are painted by transcription from different coloured ink sheets.

A prior art of this invention is disclosed in a Japanese patent application No. 310388/88 filed on Dec. 8, 1988 by the same applicant of the present invention.

In this prior art, there are provided an ink sheet stock assembly where different kinds of thermal transcription ink sheets of different colours are stored separately, and a sheet selection assembly which takes a desired ink sheet from the sheet stock assembly.

An ink sheet is wound between a pair of reels, and each end of the rotary axis of a reel is held by a supporting axis allowing the rotation of the rotary axis while the supporting axis is grasped.

In the prior art, the transfer of the supporting axes of a reel between the sheet selection assembly and the sheet stock assembly, is performed entirely by the motion of the sheet selection assembly, and therefore, the motion of the sheet selection assembly becomes complicated and a fairly large force is required for the transfer of the supporting axes between the clutch of the sheet stock assembly and that of the sheet selection assembly.

BRIEF DESCRIPTION OF THE INVENTION

Therefore, an object of the present invention is to provide a thermal transcription recorder in which the transfer of an ink sheet from an ink sheet stock assembly where different kinds of ink sheets are stored to a sheet transfer assembly which outstreches a selected ink sheet, is performed smoothly and with minimum force.

For this object, the ink sheet stock assembly moves as well as the sheet transfer assembly in the transfer motion, the sheet transfer assembly moving horizontally while the ink sheet stock assembly moving vertically, simplifying the movements of both assemblies.

In the ink sheet stock assembly of this invention, each supporting axis of an ink sheet reel is grasped by an axis clutch in which the supporting axis can move only to left in a horizontal direction, and in the sheet transfer assembly of this invention, each supporting axis is grasped by an axis clutch in which the supporting axis can move only to upward in a vertical direction. This clutch mechanism together with the horizontal motion of the sheet transfer assembly and the vertical motion of the ink sheet stock assembly remarkably simplify the reel transfer motion.

BRIEF DESCRIPTION OF THE DRAWINGS

Further objects, features, and advantages of this invention will become apparent from a consideration of the following description, the appended claim, and the accompanying drawings.

FIG. 5 is a schematic elevational view illustrating the motion of the drive mechanism of the sheet transfer assembly.

FIGS. 6A–F are schematic drawings illustrating the transfer action of a supporting axis between an axis clutch in the ink sheet stock assembly and that in the transfer assembly.

DETAILED DESCRIPTION OF THE PREFERRED EMBODIMENT

Figure 1:
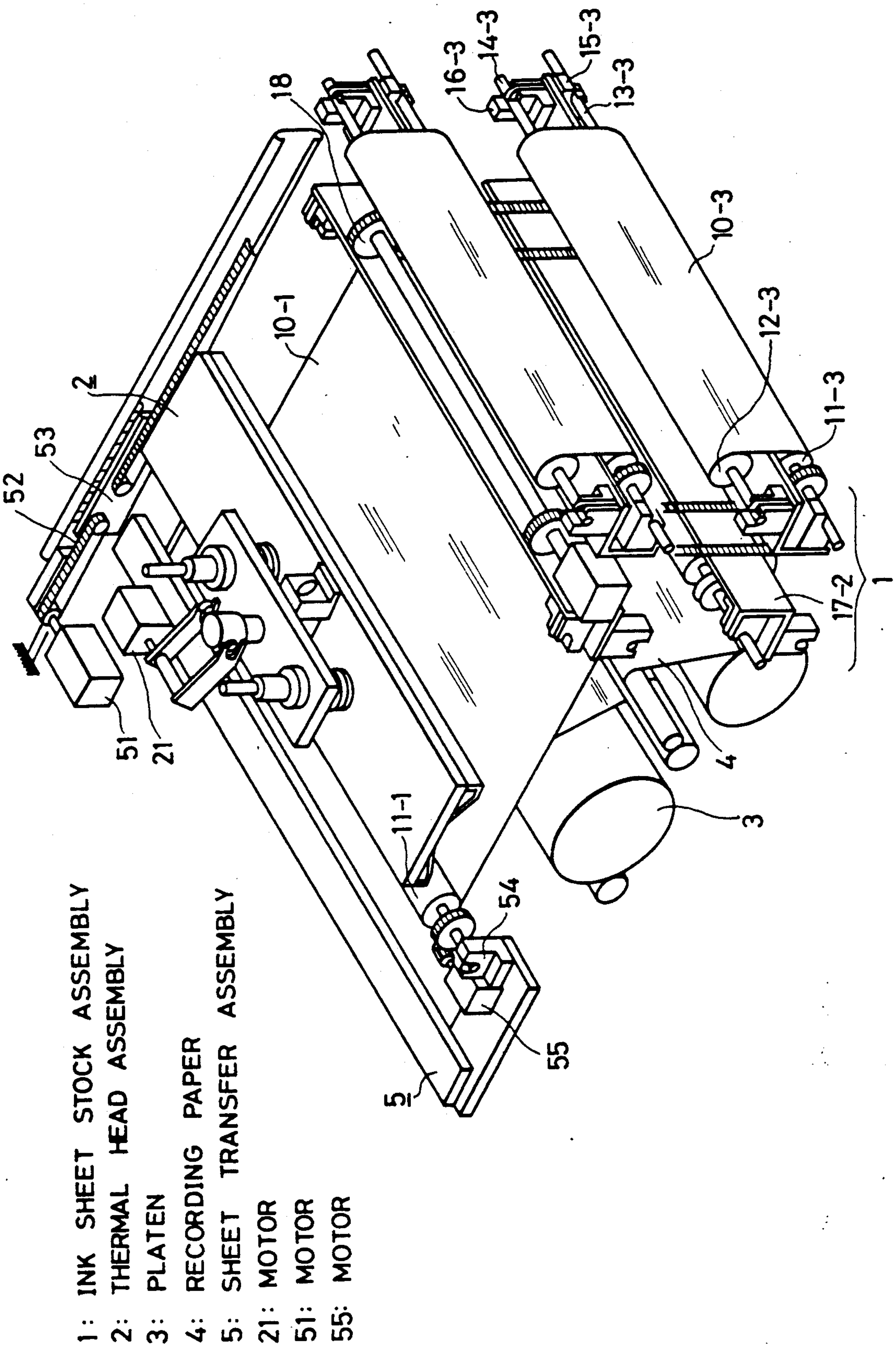
FIG. 1 is a perspective view of an embodiment of this invention.

The perspective view of FIG. 1 shows an embodiment of this invention, in which 1 is an ink sheet stock assembly, 2 is a thermal head, 3 is a platen, 4 is recording paper, 5 is a sheet transfer assembly, 10-1 is an ink sheet outstretched from a first pair of ink sheet reels in the ink sheet stock assembly, the numeral after dash indicating the serial number, and when this serial number is omitted, the remaining numeral meaning any one of the same parts. 11 is a sheet take-up reel, 12 is a sheet stock reel, a sheet take-up reel 11-1 and a sheet stock reel 12-1 constituting the first pair of ink sheet reels.

13 is a supporting axis for a sheet take-up reel 11, 14 is a supporting axis for a sheet stock reel 12, 15 is an axis clutch for sheet take-up reel 11, and 16 is an axis clutch for sheet stock reel 12.

17 is a reel support, 18 is a drive mechanism of the ink sheet stock assembly 1, and 21 is a motor for lifting the thermal head 2.

Motor 51 is a motor of the drive mechanism for the sheet transfer assembly 5, 52 is a belt of the drive mechanism for the sheet transfer assembly 5, 53 is an angle bar of the drive mechanism of the sheet transfer assembly 5.

54 is an axis clutch of the sheet transfer assembly 5, and 55 is a sheet take-up motor.

Figure 2:
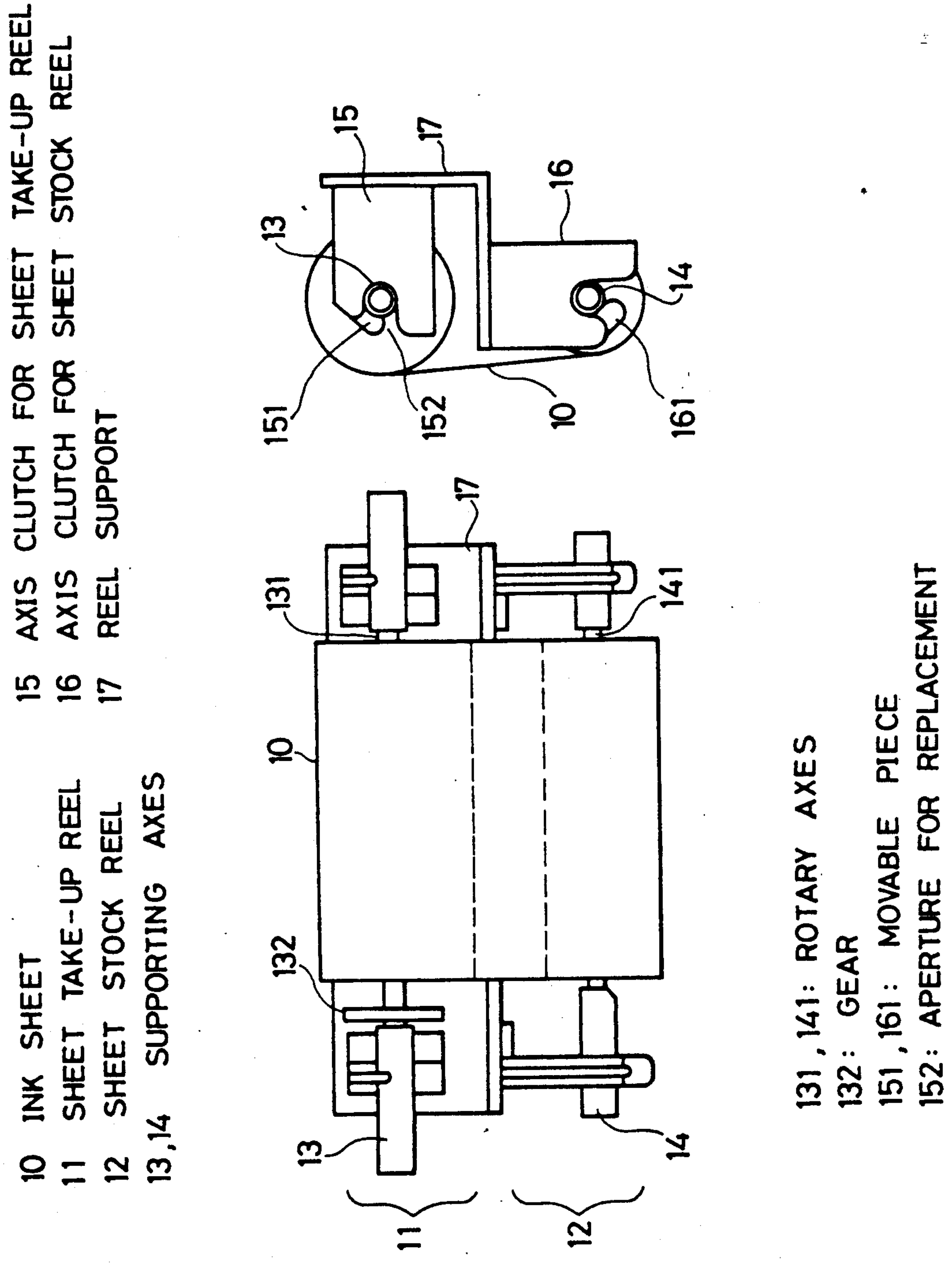
FIG. 2 is a schematic plan and side views illustrating a pair of ink sheet reels.

FIG. 2 is a schematic plan and side views illustrating one pair of the pairs of ink sheet reels stored in the ink sheet stock assembly 1 of FIG. 1. In all the drawings from FIG. 1 to FIG. 8, the same numerals indicate the same or the corresponding parts. And in FIG. 2, 131 and 141 are respectively rotary axes, 132 is a gear fixed to the rotary axis 131; 151 and 161 are movable pieces of the axis clutch 15 and 16 respectively.

As shown in FIG. 2, a pair of ink sheet reels composed of a sheet take-up reel 11 and a sheet stock reel 12, is mounted on a reel support 17. An ink sheet 10 is wound between the sheet take-up reel 11 and a sheet stock reel 12. In the reel support 17, are provided an axis clutch 15 for sheet take-up reel and an axis clutch 16 for sheet stock reel.

The rotary axes 131 and 141 are respectively supported by the supporting axes 13 and 14 in such a way that the rotary axes 131 and 141 can be freely rotated in the supporting axes 13 and 14. The axis clutch 15 grasps the supporting axis 13. The movable piece 151 is held in a closed position by an elastic force of a spring (not shown in the drawing), reducing the aperture for replacement 152 to prevent the slip out of the supporting axis 13.

When the supporting axis 13 begins to move to left in the horizontal direction, the movable piece 151 is pushed by the supporting axis 13 and is rotated around its pivot (not shown in the drawing) against the elastic force of the spring. The aperture for replacement 152 becomes wider and the supporting axis 13 escapes from the axis clutch 15.

When the supporting axis 13 approaches to the empty axis clutch 15 from left in the horizontal direction, the supporting axis 13 touches the movable piece 151. The movable piece 151 is pushed and rotated to enlarge the aperture for replacement 152. When the supporting axis 13 is grasped by the axis clutch 15, the movable piece 151 comes back to its original position by the elastic force of the spring.

The motion of the movable piece 161 is similar; and the supporting axis 14 is put in and taken out from the axis clutch 16 in the vertical direction.

Figure 3:
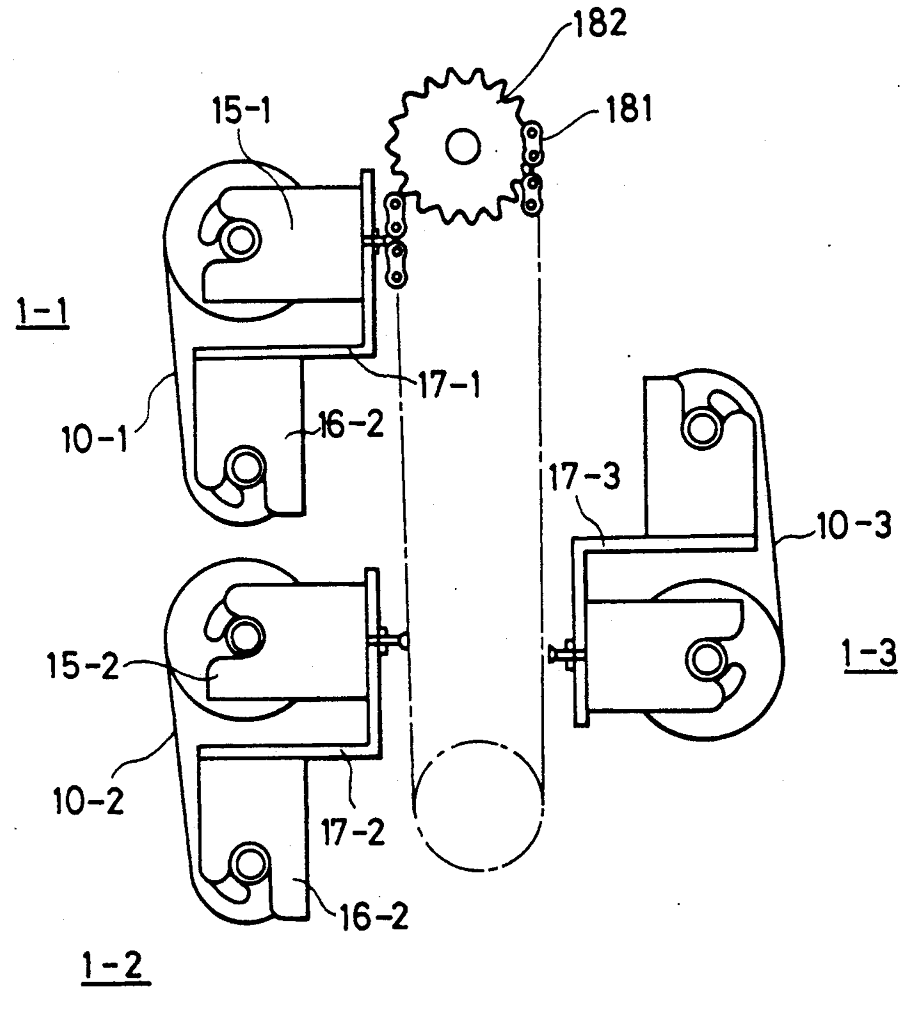
FIG. 3 is a schematic elevation illustrating the motion of the drive mechanism of the ink sheet stock assembly.

FIG. 3 illustrates the notion of the drive mechanism 18 of the ink sheet stock assembly 1. In FIG. 3, 1-1, 1-2, 1-3, . . . are respectively the first, the second, the third . . . pair of ink sheet reels, 181 is a roller chain, and 182 is a chain wheel. As shown in FIG. 1, roller chains are provided on both sides, and one chain 181 on one side is shown in FIG. 3.

Figure 4:
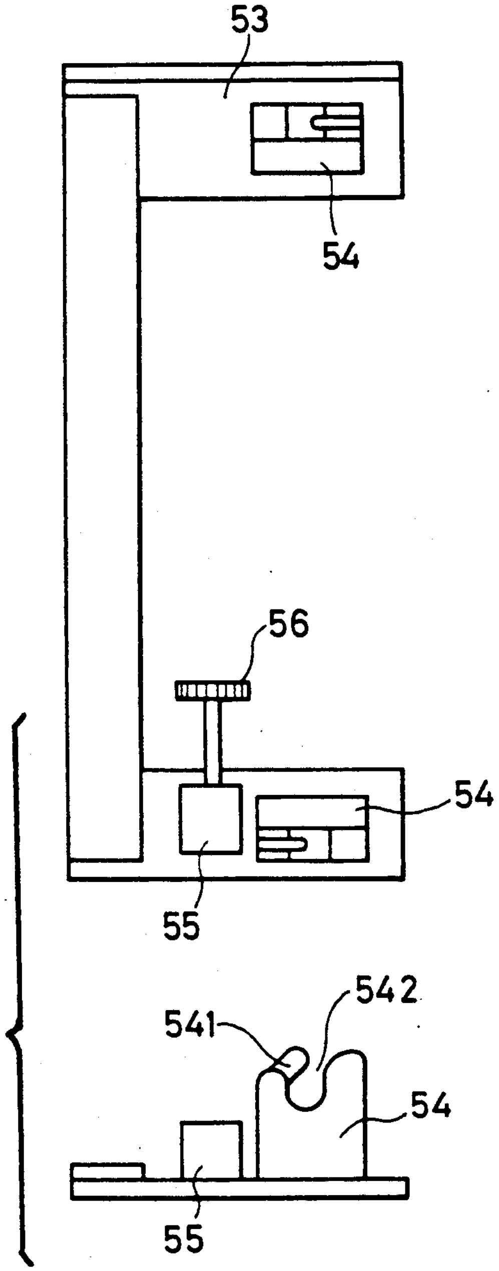
FIG. 4 is a plan and elevational views illustrating the sheet transfer assembly.

FIG. 4 shows the sheet transfer assembly 5, and in FIG. 4, 56 is a gear driven by the sheet take-up motor 55, 541 is a movable piece, and 542 is an aperture for replacement.

The axis clutch 54 of the sheet transfer assembly 5 grasps the supporting axis 13 in a similar way as the axis clutch 15, and the supporting axis 13 is put in and taken out from the axis clutch 54 in the vertical direction.

The drive mechanism of the sheet transfer assembly 5 is shown in FIG. 5. And in FIG. 5, 56, 57, 58 and 59 are respectively pulleys, and 60 is a belt. A part of the belt 60 is shown as the belt 52 of the drive mechanism of the sheet transfer assembly in FIG. 1.

The pulley 56 is driven by the motor 51 of the drive mechanism of the sheet transfer assembly (refer to FIG. 1). The both ends of the belt 60 and the pulleys 56 and 57 are fixed as shown in FIG. 5, and when the pulley 56 is rotated by the motor 51, the angle bar 53 is displaced in the lateral direction to displace the whole body of the sheet transfer assembly 5 which is fixed to the angle bar 53, in the lateral direction.

In order to facilitate the displacement of the sheet transfer assembly 5, a pair of guide rails are provided on the side of the angle bar 53 and on the opposite side. The guide rail on the opposite side is not shown in FIG. 1.

In the displacement of the sheet transfer assembly 5, the left end position is called the outstretched position and the right end position is called the transfer position. The horizontal direction of this recorder is defined by the line connecting the outstretched position and the transfer position.

The drive mechanism 18 of the ink sheet stock assembly 1 shown in FIG. 3 places a selected ink sheet take-up reel 11 to the transfer position. A position of a sheet take-up reel higher than the transfer position where the reel support 17 is not in the way of the displacement of the sheet transfer assembly 5 is called a transfer preparatory position. The drive mechanism 18 of the ink sheet stock assembly 1 brings a selected sheet take-up reel 11 to the transfer preparatory position. Between the transfer preparatory position and the transfer position, the axis clutch 15 moves in a vertical direction.

Now, the sheet transfer action is described in connection with FIG. 6. In FIG. 6, axis clutches 15 and 54 are shown without the movable pieces 151 and 541.

In FIG. 6(A), the supporting axis 13 of a sheet take-up reel 11 is grasped by the axis clutch 15 in the ink sheet stock assembly 1. The empty axis clutch 54 of the sheet transfer assembly 5 is placed to the transfer position. The axis clutch 15 comes down from the transfer preparatory position to the transfer position.

FIG. 6(B) shows a state where both axis clutches 15 and 54 are at the transfer position and the supporting axis 13 is grasped by both clutches 15 and 54. From this position, the sheet transfer assembly 5 moves to left in the horizontal direction. The supporting axis 13 escapes through the aperture for replacement 152 (refer to FIG. 2) and moves to left in the axis clutch 54 as shown in FIG. 6(C). In this movement, the rotary axis 141 in the supporting axis 14 of the sheet stock reel 12 rotates, and the ink sheet 10 is outstretched.

In the outstretched position shown in FIG. 1, the gear 132 of FIG. 2 engages to the gear 56 of FIG. 4 to enable the rotation of the rotary axis 131 of the sheet take-up reel 11.

When a sheet take up reel 11 is to be put back to the ink sheet stock assembly 1, the corresponding axis clutch 15 is in the transfer position, and the axis clutch 54 approaches from left to the transfer position as shown in FIG. 6(D). When the axis clutch 54 reaches to the transfer position, the supporting axis 13 is grasped by both axis clutches 15 and 54 as shown in FIG. 6(E). From this position, the axis clutch 15 moves upward. The supporting axis 13 escapes through the aperture for replacement 542 (refer to FIG. 4) and is put back to the ink sheet stock assembly 1 grasped by the axis clutch 15 as shown in FIG. 6(F).

Figure 7:
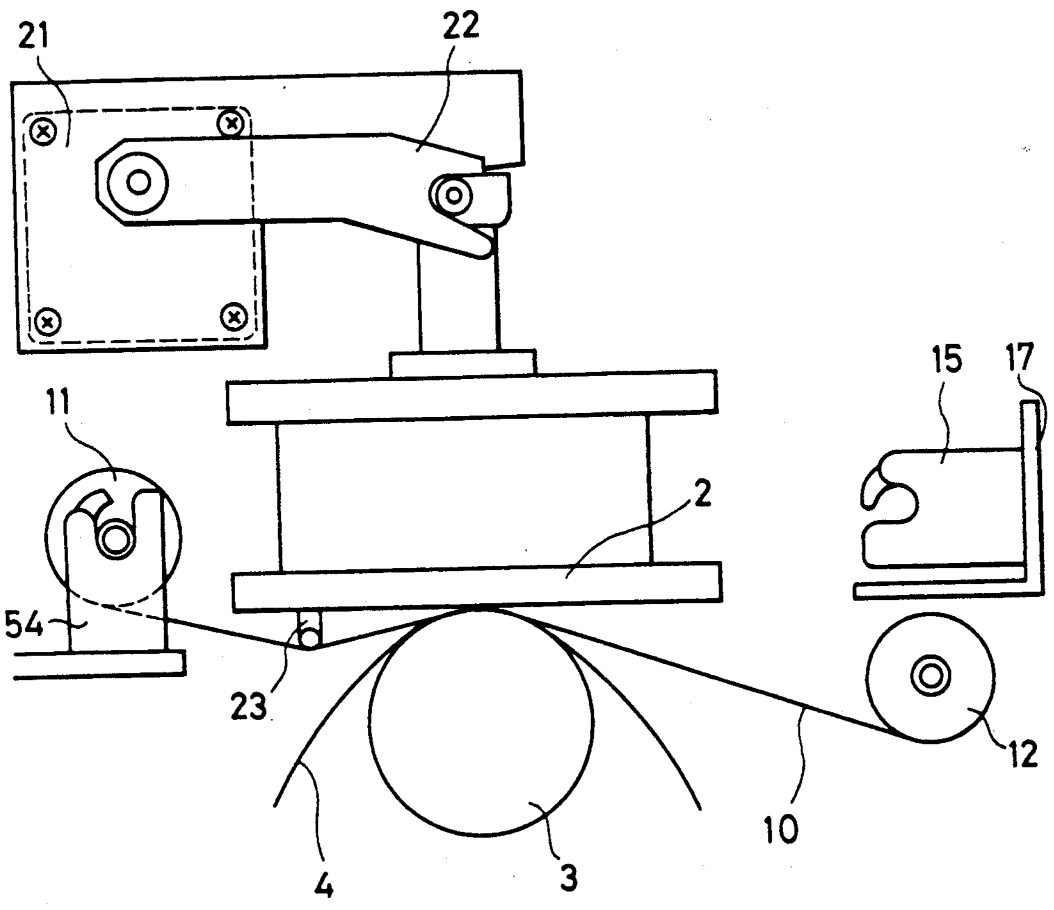
FIG. 7 is an elevation illustrating an ink sheet stretched under the thermal head.

Referring to FIG. 7, 22 is a lever for the up-down motion of the thermal head assembly 2. This lever 22 is driven through a gear mechanism (not shown in the drawing) from the motor 21. In a recording mode, the thermal head assembly 2 is held in the down position as shown in FIG. 7, and a depressing member 23 depresses the ink sheet 10 on the surface of the recording paper 4.

In a sheet transfer mode, the thermal head assembly 2 is held in the up position where the thermal head assembly 2 is not in the way of the path of the sheet transfer assembly 5.

The motor 55 (refer to FIG. 1) drives the rotary axis 131 through the gears 56 and 132 (refer to FIG. 4 and FIG. 2) to take-up the ink sheet 10.

In the embodiment shown in FIG. 3, the two reels in a pair of ink sheet reels are arranged in a vertical direction, and the reel supports 17 (refer to FIG. 2) are mounted on a roller chain. But various other drive mechanism of the ink sheet stock assembly 1 can be designed for this invention. FIG. 8 shows some of these embodiments. And in FIG. 8, 183 in FIG. 8(D) is a rotating shaft.

Figure 8A:
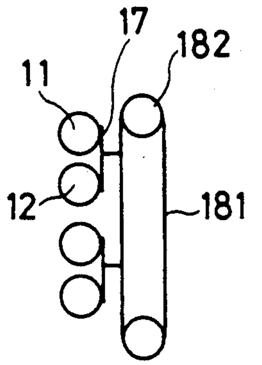
FIG. 8 shows several different embodiments of the ink sheet stock assembly of this invention.
Figure 8B:
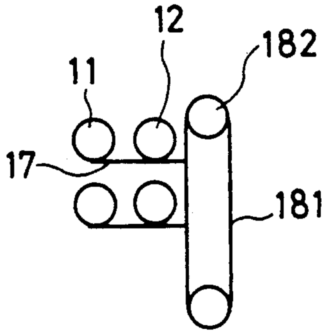
Figure 8C:
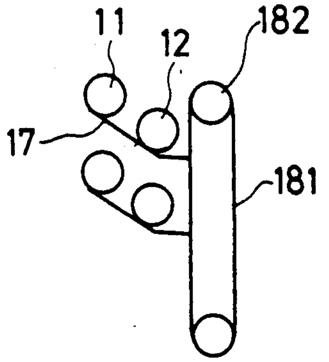
Figure 8D:
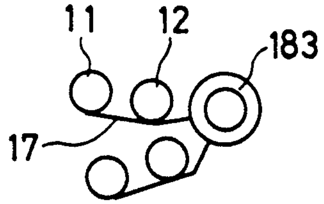

The embodiment shown in FIG. 8(A) corresponds to the embodiment shown in FIG. 3. In the embodiment shown in FIG. 8(B), the two reels 11 and 12 are arranged in a horizontal direction, and in the embodiment shown in FIG. 8(C), the two reels 11 and 12 are arranged in an oblique direction. In the embodiment shown in FIG. 8(D), the rotating shaft 183 drives the reel support 17.

The drive mechanism of the sheet transfer assembly 5, the drive mechanism 18 of the ink sheet stock assembly 1, and the motor 21 for the up down motion of the thermal head assembly 2 are program controlled from a host computer (not shown in the drawing), and any ink sheet selected from various kinds of ink sheets can be automatically outstretched with minimum force for the transfer action of a sheet take-up reel 11.

What is claimed is:.

1. A thermal transcription recorder where printing ink on an ink sheet is heated and transcribed on a surface of recording paper; comprising an ink sheet stock assembly 1 holding plural number of reel support 17, each one reel support supporting a pair of ink sheet reels comprising a sheet take-up reel 11 and a sheet stock reel 12, one end of an ink sheet being fixed to the sheet take-up reel and the other end of the ink sheet being fixed to the sheet stock reel in such a way as the direction of the length of the ink sheet becomes perpendicular to the rorary axes 131, 141 of these reels 11, 12, said rotary axes 131, 141 being respectively supported by supporting axes 13, 14 in such a way as these rotary axes can rotate in the supporting axes, said supporting axis 13 of the sheet take-up reel is grasped by an axis clutch 15 for sheet take-up reel in said reel support 17, said axis clutch 15 for sheet take-up reel having an aperture 152 for replacement which allows the supporting axis 13 to escape from the clutch 15 to left in a horizontal direction;

a sheet transfer assembly 5 having an axis clutch 54 for grasping said supporting axis 13, said axis clutch 54 having an aperture for replacement which allows the supporting axis 13 to escape from the clutch 54 upward in a vertical direction;

a drive mechanism of the sheet transfer assembly for displacing the sheet transfer assembly in a horizontal direction, the left end position of the sheet transfer assembly being called the outstretched position and the right end position of the sheet transfer assembly being called the transfer position;

a drive mechanism 18 of the ink sheet stock assembly for bringing a selected reel support to a transfer preparatory position, and then moving the reel support vertically between the transfer preparatory position and the transfer position where the central axis of the clutch cavity of the axis clutch 15 coinciding to that of the axis clutch 54 when the sheet transfer assembly is at the transfer position;

a thermal head assembly 2 depressing an ink sheet 10 outstretched on a surface of recording paper 4 moving on a platen 3;

an up-down mechanism of the thermal head assembly, holding the thermal head assembly at a down position during a recording mode, and at an up position during an ink sheet transfer mode; and a serial control means for controlling the drive mechanism of the sheet transfer assembly, the drive mechanism of the ink sheet stock assembly, and the up-down mechanism of the thermal head assembly to perform a serial control in which:

(a) the thermal head assembly is held at the up position, (b) an empty axis clutch 15 for sheet take-up reel is positioned at the transfer position, (c) the sheet transfer assembly approaches from left to the transfer position, and at the transfer position, the supporting axis 13 in the axis clutch 54 is grasped by the axis clutch 15 too, (d) the axis clutch 15 moves upward taking the supporting axis 13 from the axis clutch 54, (e) a new axis clutch 15 holding a new supporting axis of a new sheet take-up reel 11 moves from the transfer preparatory position to the transfer position, and at the transfer position, the new supporting axis 13 in the axis clutch 15 is grasped by the axis clutch 54 too, (f) the sheet transfer assembly moves to left taking the new supporting axis 13 and outstretching a new ink sheet 10, and at the outstretched position, the gear 132 on the rotary axis 131 engaging to a motor driven gear, (g) the thermal head assembly comes to the down position, depressing the outstretched ink sheet to the surface of the recording paper.

* * * * *